April 17, 1928. 1,666,516
W. TSCHUDY
VAPOR RECTIFIER
Filed Nov. 17, 1919 6 Sheets-Sheet 2

WITNESS
INVENTOR
William Tschudy
BY
ATTORNEY

April 17, 1928.  
W. TSCHUDY  
VAPOR RECTIFIER  
Filed Nov. 17, 1919

WITNESS

INVENTOR  
William Tschudy  
BY  
ATTORNEY

April 17, 1928.  
W. TSCHUDY  
VAPOR RECTIFIER  
Filed Nov. 17, 1919  
1,666,516  
6 Sheets-Sheet 4

WITNESS

INVENTOR  
William Tschudy  
BY  
ATTORNEY

April 17, 1928.

W. TSCHUDY 1,666,516

VAPOR RECTIFIER

Filed Nov. 17, 1919

WITNESS

INVENTOR
William Tschudy
BY
ATTORNEY

Patented Apr. 17, 1928.

1,666,516

UNITED STATES PATENT OFFICE.

WILLIAM TSCHUDY, OF YONKERS, NEW YORK.

VAPOR RECTIFIER.

Application filed November 17, 1919. Serial No. 338,683.

In my prior Patent No. 1,189,887 issued July 4th, 1916, reissued March 9, 1920, No. 14,816, I have disclosed and claimed a method of controlling the operation of a gas or vapor apparatus which involves the changing of the physical condition of the gas or vapor in the apparatus. The specific way in which the physical condition of the vapor is described as being changed is by the increase or decrease of the pressure or density of the vapor. By means of this method I am able to reduce the resistance in the rectifier to the minimum, regulate the amount of watts consumed in the apparatus and generally increase its efficiency.

My present invention, in many of its important features involves an improved form of apparatus for carrying out the method disclosed and claimed in said patent although certain features of my present invention may be applicable to vapor rectifiers or other vapor or gas apparatus, such as wireless receivers, detectors, etc., not designed for carrying out said method.

One object of my present invention is to provide efficient and practical means to regulate and control the electric characteristics of the apparatus, that is, the bulb or tank loss, anode current, anode voltage, wave form, rectified current, rectified voltage, general efficiency, etc.

A further object of my invention is to facilitate the starting of the rectifier and at the same time providing for the regulation of the arc length. This I accomplish by the control or adjustment of one of the electrodes toward and from the other. Such electrode regulation may be employed in a rectifier irrespective of whether or not the method disclosed in my prior patent is employed, but when such electrode regulation is employed in connection with said method it forms an absolute control over the arc. By providing means for securing a relative adjustment of the cathode and anode, one may be moved toward the other and then by withdrawing it to its former position or to any desired position the apparatus may be started and the arc controlled. Furthermore by the use of such a movable electrode the high potential necessary for starting a mercury vapor apparatus may be overcome and the use of a transformer avoided. This renders the apparatus particularly adapted for outdoor rectifier sub-stations. Although the desired relative adjustment may be secured in different ways, a cathode adjustment is preferable for a polyphase rectifier and is also preferable even in a single phase rectifier as it permits of simple and efficient anode cooling. By such adjustment of one of the electrodes and the overcoming of the high potential necessary for starting, I am able to secure a reduction of cost represented by the omitted transformer or auto-transformer. The losses in a vapor rectifier include not only the bulb or tank loss, but also the transformer loss and by the elimination of the transformer I am, of course, able to avoid the loss which ordinarily takes place in that portion of the apparatus. By eliminating the transformer loss there remains only the bulb or tank loss and this, by the electrode and the density regulation may be reduced to a minimum and the highest efficiency secured. It has been found that the transformer and bulb losses increase with increase of frequency or number of cycles. It is, therefore, evident that this invention has great advantages in converting high frequency current.

A further improved feature of my invention involves a novel cathode construction whereby a special vapor path is provided for the non-conducting portion of the vapor passing to the upper part of the rectifier tank where it condenses and flows back to the cathode. This is accomplished by a novel use of shields mounted on the mercury cups instead of on the tank cover as in present practice.

A further feature involves an automatic valve control whereby the density in the rectifier may be increased or decreased as required to keep it within limited working conditions.

A further improved feature of my invention involves the construction of the tank whereby the body or wall of the tank may be formed of one piece with the anode supports. The anodes are formed of metal insulated from the main electrode body whereby all of the acting parts of the anodes are properly insulated from each other.

My invention also involves certain improvements in the method of automatically regulating the anode voltage, anode current, rectified current, etc., and many novel features of apparatus for automatically carrying out said method. For very large capacity rectifiers as used in connection with railway work, ship propulsion, electrolytic work, wireless work, out-door rectifier substation, and as replacement for motor generator sets, rotary converters, etc., the automatic regulation of the density in accordance with working conditions is highly important and, in fact, well nigh indispensable as it regulates not only the efficiency but also the operating conditions and stability of the arc.

In the accompanying drawings I have illustrated several forms of apparatus embodying or designed for carrying out my invention, some of these forms being shown more or less diagrammatically.

In these drawings.

Figure 1:
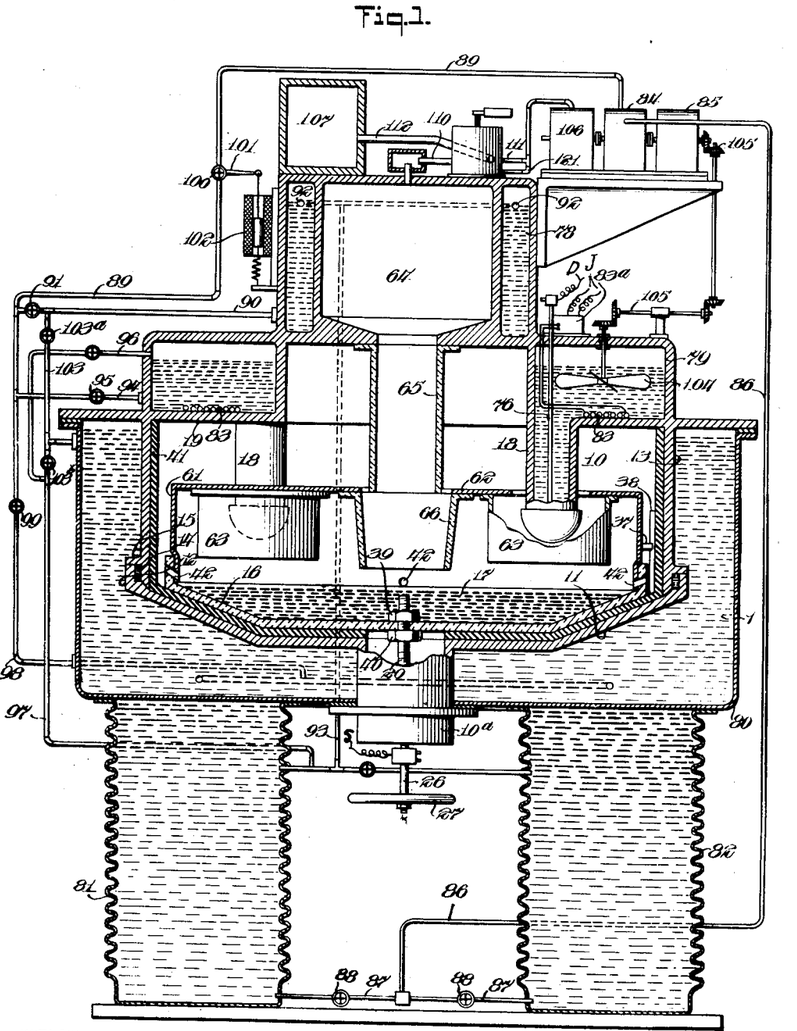
Figure 1 is a central vertical section of an apparatus constructed in accordance with my invention.

In the form shown in Figure 1 the main chamber bulb or tank 10 of the rectifier is cast of mercury resisting non-magnetic metal, such as a nickel-iron alloy or of any other suitable material. It may include any desired number of sections or parts rigidly secured together in such a manner as to form air-tight joints. As shown, the bottom 11 of the chamber has an annular upstanding peripheral flange 12 into which the lower edge of the peripheral wall 13 of the body extends. This wall and flange may be spaced apart to receive a packing 14 and the parts may be rigidly secured in any suitable way, as for instance, by screws connecting a flange 15 on the wall 13 to the upper edge of the flange 12. The lower edge of the wall 13 is shown as having a beveled end engaging with a corresponding bevel seat on the bottom 11. As previously indicated, I do not wish to be in any way limited to the number of sections or the particular sealing means for forming tight joints except as claimed.

In the lower portion of the main tank or bulb of the rectifier is mounted the cathode. This is in the form of a shallow mercury cup 16 which may be of a size approaching that of the chamber itself. The cup is mounted so that it may be adjusted vertically not only for regulating the length of the arc, but also for bringing the body of mercury 17 in the cup into contact with the anode or anodes. In using the device as a 3-phase single-unit vapor rectifier there are provided 3 anodes which are in the form of tubular projections 18 extending down from the top or from a transverse wall portion 19 of the chamber.

Various means may be employed for raising and lowering the cathode and such means may include mechanical or electrical means and may be controlled either automatically or manually.

Figure 2:
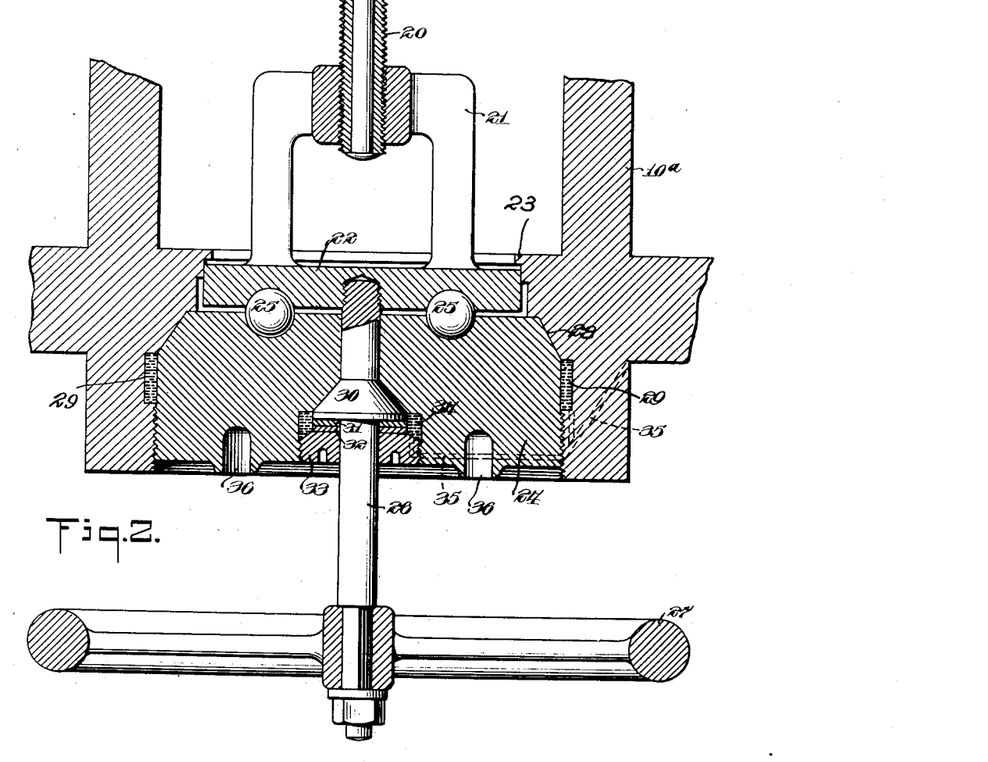
Figure 2 is a section on an enlarged scale of a mechanical means for raising and lowering the cathode.

In Figure 2 I have shown the bottom wall 11 of the tank or bulb provided with a depending cylinder flange 10$^a$ within which is mounted one form of mechanical mechanism which is so designed as to form an air-tight seal. The mercury cup is shown as being rigidly secured to a threaded rod 20 mounted in a threaded aperture of a spider 21. The latter is carried by a closure plate 22 rotatable within an annular guide 23 adjacent to the lower end of the flange 10$^a$. This closure plate 22 is mounted on a stationary closure 24 held in place by screw threads, the two plates being separated by an annular row of bearing balls 25 or other suitable anti-friction bearings. The closure 24 has a center aperture through which extends a shaft 26 to the lower end of which is secured a handle 27 or any other suitable means for rotating the shaft. For forming an air tight seal, the closure 24 has a ground bevel seat 28 engaging with a corresponding seat in the wall of the tank and between this seat and the threaded connections is a chamber 29 filled with mercury. The shaft 26 has a collar 30 presenting a beveled ground upper face engaging a ground seat on the closure 24 and below this collar is an asbestos washer 31 and an iron washer 32 and a unit 33. Around these washers is a mercury chamber 34. The chambers 29 and 34 may be filled or replenished with mercury in any suitable manner as, for instance, by means of passages 35. The closure 24 may have any suitable formation at its lower end for engagement with a wrench or key to facilitate the seating and proper tightening of the closure. It is shown as having a pair of sockets 36 for this purpose.

The shaft 26 is thus rotatable in the closure 24 and is rigidly secured to the closure plate 22 and to the handle. It will be noted that by rotating the handle, the closure plate 22 and the threaded spider on the latter may be rotated. The engagement of the spider with the rod 20 permits the elevation or lowering of the rod 20 and the mercury cup if these be held against the rotation during the rotation of the handle 27. Any suitable means may be provided for holding the mercury cup against rotation as, for instance, a formed projection 37 engaging with a rod, flange or projection 38 rigid with the tank wall and parallel to the direction of movement of the mercury cup, as shown in Figure 1.

The mercury cup 16 is preferably formed of quartz and may be secured to the rod 20 in any suitable manner, as for instance, by the use of a nut 39 on the upper end of the rod 20 and clamping the bottom of the mercury cup to a collar or flange 40 on the rod. To prevent any possible short circuiting the tank is preferably provided with a lining 41 of quartz, enamel or the like. To facilitate the return to the cathode cup of any mercury condensing on and running down this lining wall, the wall of the cup is provided with one or more drain passages 42 just above the normal mercury level in the cup.

Figure 3:
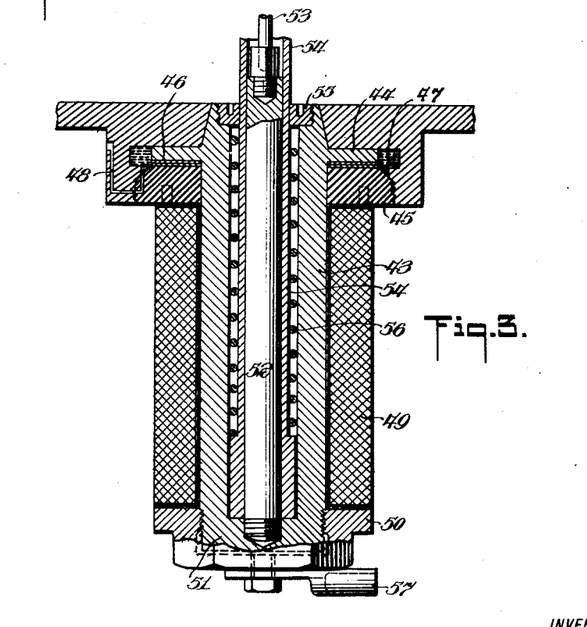
Figure 3 is a similar section of an electrical means for raising the cathode.

It will, of course, be evident that various other means may be employed for operating the cathode or mercury cup, for instance, an electric motor might be directly connected or geared to the shaft 26. A lever might be employed in place of the handle 27 and any suitable means employed for operating the lever or I might employ a solenoid and directly or indirectly connect the rod 20 thereto. In Figure 3 I have shown a solenoid construction for the direct vertical raising or lowering of the cathode. In this construction a tube of any suitable material as, for instance metal, is rigidly clamped to the bottom of the rectifier tank. The tube has an annular flange 44 which is clamped to the wall by a threaded nut 45 and iron and asbestos washers 46. Around the washers and the flange 44 is an annular channel 47 which may be filled with mercury through a passage 48 to effect a tight seal.

Encircling the tube 43 is a removable solenoid coil 49 secured in place and supported by a threaded nut 50, secured to the lower end of the tube. The tube is closed at its lower end so that there can be no leakage of air or gas.

The lower end wall 51 of the tube has an upstanding guide or shaft portion 52 concentric with and spaced from the tube and having its upper end connecting to the mercury cup or cathode by a flexible cable 53. Encircling this rod 52 and axially slidable thereon is a tube or sleeve 54 of increased thickness at its lower end to serve as the solenoid core. The upper end of this sleeve or case is guided by a nut 55 and is rigidly secured to the bottom of the cathode or mercury cup in any suitable manner not shown. Encircling the core, is a coil spring 56 acting downwardly and in opposition to the pull on the core when the coil is energized. A main terminal 57 for the cathode may be secured to the unit 50 and thereby to the center of the bottom wall 51 which latter is directly connected to the cathode through the rod or bar 52 and the cable 53. Terminals of any suitable character may be connected with the solenoid coil and this coil circuit may be automatically or manually controlled. When the coil is energized the core 54 will be lifted and the cathode will be brought up to the anode or anodes. Upon the establishment of the main circuit the solenoid circuit may be broken and the spring alone or the weight of the cathode alone or both together will operate to lower the cathode into its former position.

It will be noted that the entire casing enclosing the solenoid is formed air tight so that the cathode may be raised or lowered at will without liability of leakage of air into the main chamber.

The mercury cup carries a shield or cover 61 with apertures in the top wall 62 corresponding in position with the depending electrodes 18 and of sufficiently larger size than said electrodes to permit the latter to extend below the shield and down into the mercury in the cup when the cathode is raised. The top wall 62 of this main shield has depending cylindrical tubes or sleeves 63 encircling the anode apertures and constituting anode shields. These extend to but not into the mercury in the cup.

The main tank or bulb of the rectifier has a condensing chamber 64 in the upper portion thereof and from this a vapor tube 65 preferably of quartz extends down to approximately the normal position of the top wall 62 of the main shield. The latter has an aperture registering with this tube and of slightly larger size so that the tube may extend through the aperture when the cathode and the shield are raised. The top wall 62 of the shield also has a depending annular flange or shield 66 spaced therefrom but telescoping with the tube 65 during the upward movement of the cathode. This permits the mercury vapor which condenses in the condenser chamber 64 to flow down the wall of the tube 65 and back into the cathode without being diverted toward the anodes, and also tends to prevent mercury vapor from passing from the vicinity of the arcs directly through the center portion of the apertures to the condensing chamber. Without intending to give a complete theory of this arrangement, I mention the facts that the dimension and the shape of the tubes providing a path for the non-conducting vapor emanating from the cathode depend upon the maximum ampere capacity of the rectifier and as a general rule would say it is of importance to so design this vapor path that the most part of the vapor is conducted away to the condensing chamber and back to the cup by the mentioned arrangement.

Figure 4:
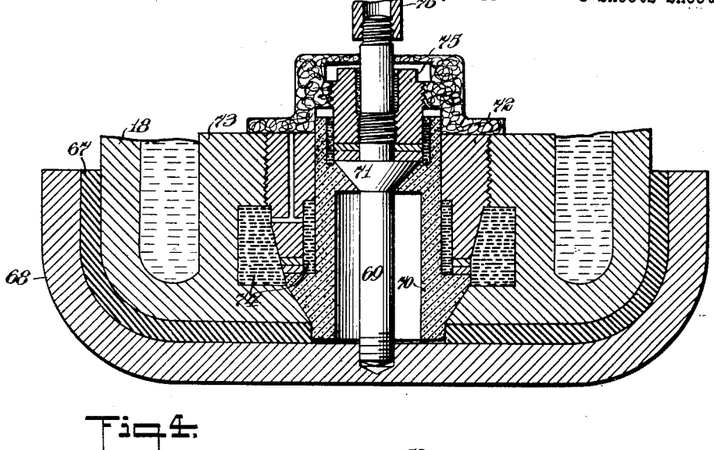
Figure 4 is an enlarged detail in section of the terminal of an anode.

The lower end of each anode is preferably constructed substantially as shown in Figure 4. This is of special importance where the supporting body for the anode is to be formed integral with the wall of the casing or as a tube or sleeve of metal directly and rigidly connected to said wall. In case the part coming directly in contact with the arc burns out water does not flow into the rectifier tank as is the case with the usual anode construction. It is a well known fact in case water enters into a rectifier tank the same has to be cleaned out first before ready for operation.

For a 3 phase rectifier three of these anodes 18 are employed. The end wall of each anode may be electrically insulated from the body as follows: The anode support 18 has a fiber or other insulation jacket 67 particularly at its lower end. Outside of this is the anode 68 preferably formed of sheet metal and constituting a cap around the lower end portion of the body 18. This cap should be of a metal which does not oxidize and can have any desired shape. This conductor is rigidly secured to a center rod 69 which projects up through the electrode body to the exterior of the rectifier and serves as a current conductor. The electrode support 18 is hollow to form a water chamber for cooling purposes, as hereinafter referred to more in detail, and means are provided for forming a water tight and air tight seal between the interior of the electrode and the interior of the rectifier chamber. As shown, a porcelain tube 70 is provided with a beveled seat engaging in a recess in the bottom of the electrode and is provided at its upper end with a beveled seat forming a ground joint with a collar or flange 71 on the rod 69. Outside of this porcelain sleeve is a collar 72 threaded into an upstanding boss 73 on the member 18 and holding the porcelain tube in position. At the lower end of this threaded collar 72 there may be provided suitable washers and mercury chambers 74 of the same general character as those previously referred to. Above the collar or flange 71 there are employed similar washers and a mercury chamber, the washers being pressed down and the collar held down to its seat by a threaded collar 75 which is covered by a fiber cap 77. To the upper end of the rod 69 is secured a rod or tube 76 which projects up through the water chamber of the anode support 18 and connected to the main lead.

So far as concerns the details of construction of the anode and cathode and operating means of the latter above described it will be evident that these may be employed with a rectifier without the employment of the method set forth in my previous Patent 1,189,887.

The adjustable cathode may be employed with the usual anode or with the improved form of anode above described or the improved anode may be employed in a rectifier having a stationary cathode. The improved instrument, above described, is particularly desirable when used with the regulating system or method of my prior patent.

For controlling the operation of the rectifier I may control the density of the vapor within the rectifier by controlling the temperature or by controlling the pressure. The most efficient results I secured with the double regulation, that is, by varying both the temperature and the pressure to get the desired physical characteristics of the arc.

For securing temperature regulations I may use air cooling or preferably a water jacket is provided together with means for circulating and cooling or heating the water or other fluid to maintain the rectifier at the desired working temperature, and for reducing the density of the vapor by reducing the temperature. The entire rectifier might be enclosed in a single water jacket although the water jacket is preferably divided into sections whereby different parts may be independently cooled. I have shown the condenser chamber 64 provided with a water jacket 78, the upper portion of the main rectifier chamber provided with a water jacket 79 communicating with the interiors of the several anode supports, and the lower and main portion of the rectifier provided with a water jacket 80. If a limited quantity of water is to be used repeatedly instead of drawing as desired from a source of suitable cool water I may use in addition to these separate water jackets, one or more water coolers or condensers 81—82. I may also provide heating coils 83. For circulating the water or other cooling fluid and for controlling the flow I provide a water pump 84 and suitable piping connections to and from the water jackets and water coolers or condensers. The pump 84 is preferably a centrifugal pump which may be operated from any suitable source of power as, for instance, an electric motor 85. The pump draws water through a pipe 86 having separate connections 87 to the lower portions of two condensers 81 and 82, the connections being controlled by valves 88 whereby water may be drawn from either condenser. The water is delivered from the pump through a main water delivery pipe 89, which has a branch 90, controlled by a valve 91 leading to the water jacket 78. From this jacket the water may overflow through one or more outlets 92 to a pipe 93 leading to the water coolers. The main water delivery pipe has a second branch 94, controlled by a valve 95, leading to the water jacket 79. The water in this jacket may overflow through pipes 96 and 97 to the water cooler. The main water pipe also connects to a pipe 98, controlled by a valve 99, to the lower portion of the water jacket 80 at one or more points. This may have its over-flow through pipe 97 to the cooling tanks 81 and 82 but may also have its outlet connected by pipe 103 and valves 103ᵃ to the pipe 90 whereby the main jacket of the rectifier and the jacket of the vapor condenser 64 are in series. For automatically controlling the circulation of the water the main delivery pipe 89 is provided with a valve 100 connected by a lever 101 to the core of a solenoid 102. This solenoid may be connected in the rectifier circuit or in a branch thereof, or in an independent circuit whereby fluctuations in the current will act to open or close the water valve 100 to varying degrees. For instance, decrease in the efficiency of the apparatus or an increase in the watt loss in the apertures might vary the current of the solenoid 102 so as to actuate the valve 100 and thereby modify the temperature of the rectifier and increase its efficiency. In some installations the automatic regulator including the solenoid 102 might be eliminated and valve 100 manually controlled by the operator and in accordance with the readings of various indicating instruments which may be in the main or branch circuits. It is thought that the operation of the parts for temperature control will be clear from the foregoing description of this portion of the apparatus but the operation is briefly as follows:—

The centrifugal pump 84 driven by the electric motor 85 draws water through the pipes 86 and 87 from either or both water coolers or condensers, either of the valves 88 being closed, if only one condenser is needed. The water in the condenser may be cooled in any suitable manner as for instance by mere radiation through corrugated walls, fins or other radiating surface. The water is delivered from the pump through the pipe 89 and valve 100. If only the condenser 64 is to be regulated the valves 99, 95 and 103ᵃ are closed and the valve 91 opened. The cooling fluid will flow through pipe 90 into water jacket 78 and overflow through outlet 92 and pipe 93 to the water cooling unit or units. If only the chamber 79 is to be regulated, the valves 91 and 99 are closed and the valve 95 is opened letting the water flow through pipe 94 to the water jacket 79 and overflow through 96 and 97. If jacket chamber 80 is to be regulated, valves 91 and 95 are closed and 99 is opened to let water flow to jacket 80 and overflow either through pipe 103 to the water jacket 78 and thence through outlet 92 and pipe 93 to the water condensing unit or by closing 103ᵃ and opening 103ᵇ it may overflow directly to pipe 97. All the chambers may be cooled at the same time by appropriate valve regulation.

The anodes 18 have water chambers in open communication with the water jacket or chamber 79. To facilitate the circulation of water into the anodes and to secure uniform temperature in all parts of the chamber I may deliver the water directly to the lower portion of each anode, or may provide mechanical stirring means, such for instance, as one or more paddle wheels or agitators 104 driven through suitable shafts and gearing 105 from the electric motor 85 or from any other suitable source of power. In the water jacket 79 I also preferably provide heating coils 83 which may receive electric current, steam or any other desired heating medium to raise or maintain the temperature of the water. This may be particularly desirable for out-door sub-station units for use in winter to prevent the water from freezing, for instance, at such times as a rectifier is not in operation. The delivery of heating medium to the heater may be controlled automatically by a thermostat 83ᵃ.

In addition to or independently of the regulation of the vapor density by temperature control I may secure density and corresponding vapor regulation by varying the pressure within the rectifier as indicated in my prior patent. In the construction illustrated in Figure 1 the electric motor 85 serves to operate an air pump 106 for drawing out air or gas from the rectifier and reducing the pressure in the latter. There is also provided an air or gas tank 107 containing the desired gaseous medium under pressure. Suitable means are provided whereby either the suction or vacuum pump 106 or the air tank 107 may be connected to the interior of the rectifier. This means may include a manually operable valve of the kind shown in Figures 5 and 6. This includes a conical valve plug 108 mounted in a valve casing 109 with a connection 110 to the rectifier, connection 111 to the air pump and connection 112 to the air or gas tank. The valve plug has a passage 113 which may connect passage 111 or 112 with the passage 110. The valve plug is connected to a valve stem 114 having an operating handle 115. The stem is mounted in a bearing plug 116 which has a ground conical seat engaging with the casing and one or more mercury sealing chambers 117—118. The top of the valve casing may have suitable marks thereon indicating the position of the valve and the handle may have a pointer 119. To make the valve completely tight the portions of the valve chamber encircling the valve plug 109 are formed with a chamber 120 which is continuously connected to the suction by a pipe 121. Any leakage past the valve stem is prevented by a mercury sealing chamber 122.

Instead of rotating the valve stem 114 manually by a handle 115 it will, of course, be evident that the end of the handle 115 or the equivalent thereof may be connected to the core of a solenoid. The circuit of the solenoid may be independent of the main circuit and manually controlled by a circuit closer. The solenoid circuit may be a part of or connected to or influenced by the main circuit so that an increase in the watt loss due to improper vapor density conditions may be automatically corrected by the action of the solenoid in shifting the position of the valve plug 108 to re-establish the proper working conditions in the rectifier. The main chamber of the rectifier may be provided with a suitable pressure gauge, the regulating valve shown in Figures 5 and 6, a watt loss indicating instrument, a watt meter or other equivalent instrument, and the valve may be operated manually or electrically in accordance with the indication of such a pressure gauge, meter or other instrument.

Instead of having a single valve for the rectifier tank, I may provide two separate valves, one controlling communication between said tank and the pressure tank and the other controlling said communication between said rectifier tank and the vacuum. The two valves may be independently controlled either electrically or mechanically for increasing or decreasing the pressure in the main chamber.

Figure 7:
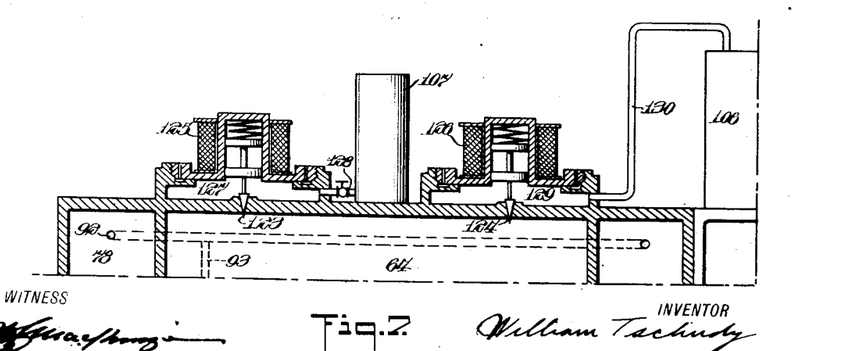
Figure 7 is a modification of the upper part of Figure 1.

In Figure 7 I have indicated a portion only of the form shown in Figure 1, but with separate electrically operated valves controlling the gas pressure. The condensing chamber 64 is shown as having two valves, 123 and 124, connected to the cores of corresponding solenoids 125 and 126. These solenoids are so mounted as to prevent any possible leakage of air. They may be somewhat as shown in Figure 3, that is, each may have a tubular portion closed at the end and air tight with the coil outside and the core inside. The valve chamber 127 above the valve 123 is connected to a pressure tank 107 by a pipe 128 which may have a manually operable shut-off valve therein. The valve chamber 129 of the valve 124 may be connected by a pipe 130 to the air pump 106. By opening the valve 123 air or gas may be admitted to the rectifier to increase the pressure and by opening the valve 124 gas may be sucked out of the chamber to reduce the pressure. The circuits of the solenoids may be automatically or manually controlled.

Figure 5:
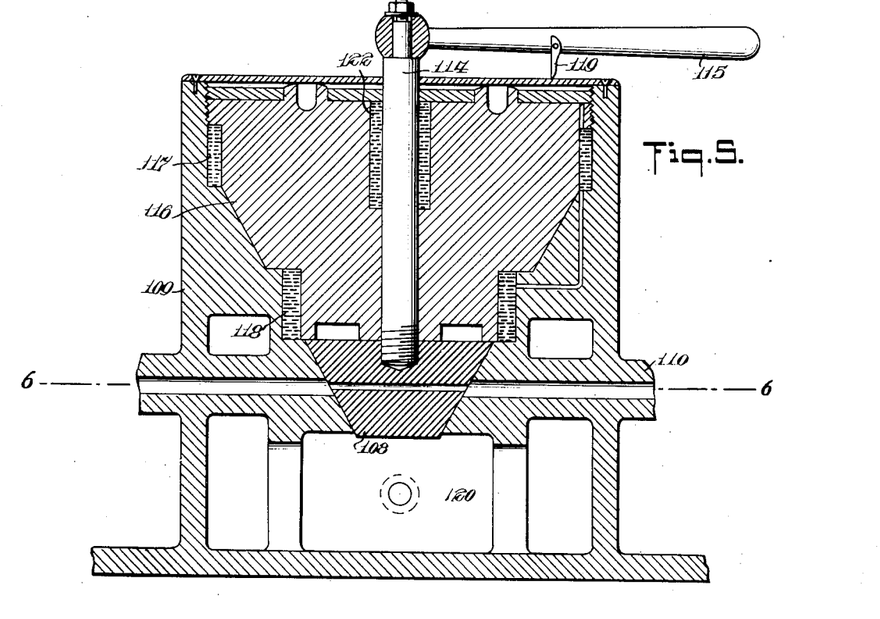
Figure 5 is the vertical section of a controlling valve for the gas or vapor.
Figure 6:
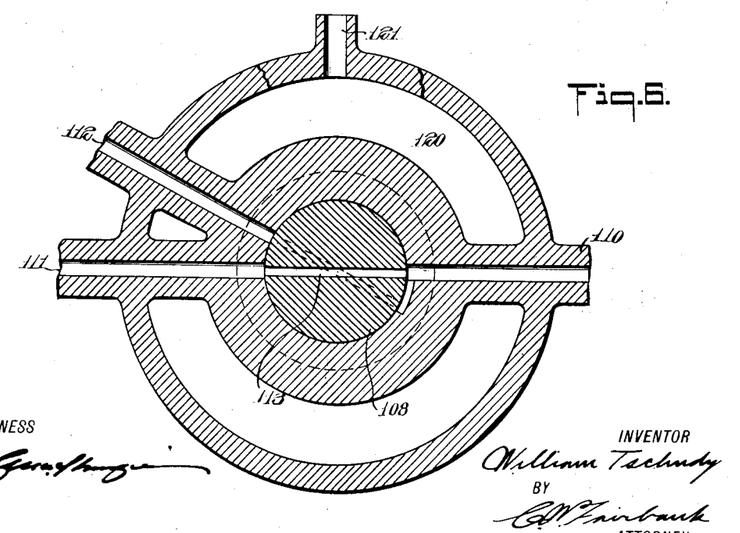
Figure 6 is a transverse section on the line 5—5 of the Figure 5.

I have illustrated my invention in connection with a three phase single unit rectifier. It will, of course, be evident that many of the important features of my invention are equally applicable to a single phase rectifier. I have shown a single cathode for use with a plurality of anodes. I might have three separate cathodes for three separate anodes or I might provide a cathode for each anode irrespective of the number of the latter. The particular construction illustrated in Figure 1 with the solenoid control of the separate gas valves of Figure 7 and the solenoid control of the cathode operator of Figure 3 may be wired, as shown in Figure 8 and operated, as follows:

The primary windings A and the secondary windings B of a three-phase transformer are shown as connected in star with a neutral C. Secondary leads are connected to the three anodes by wires D and the cathode is connected by a wire E to the load F and thence to the neutral C of the transformer. If the transformer is built for very high voltage which cannot be satisfactorily employed for the operation of the various solenoids, motors, heating coils etc. of the apparatus, I may provide a second small three phase transformer G connected to the primary leads of the main transformer and having its secondary leads connected to the various solenoids, motors, etc. As shown, the wires H controlled by a switch I lead to the electric motor 85. Wire J may lead to the heating coil 83 and in this branch of the circuit may be a thermostat K for automatically opening or closing the heating circuit J when the water reaches predetermined temperature limits. A branch circuit L with a controlling switch M leads to the solenoid 102 which controls the water valve 100. In this circuit I may insert a small auto transformer N having several taps allowing the solenoid 102 to be operated for different voltages. Other wires O from the secondary leads of the transformer G may extend to the solenoid 49 for controlling the raising and lowering of the cathode and in these may be a manually operable switch P and an auto transformer Q. A watt loss indicating instrument R may be connected in a circuit S between one of the secondary leads of the main transformer and the cathode terminal, in order to ascertain the watt loss in the tank or bulb for one anode. The secondary leads of the transformer G may also be connected to the secondary side of the main transformer, if desired. As a rule, however, the leads of the transformer G must be so connected that the motor, solenoid, heating coils, etc. can be operated before the rectifier is started. Where separate solenoid operated valves are employed for regulating the density in the rectifier, as shown in Figure 7, instead of a manually operable valve as shown in Figures 1, 5 and 6, wires T would lead from the secondary side of the transformer G to the two solenoid coils 125 and 126 and suitable switches U could be used for controlling the operation of these solenoids. It is, of course, evident that all of the solenoids might be operated on from the D. C. side of the rectifier or can be operated from a storage battery or other D. C. source.

It is well known in the art that in a properly working rectifier the anode current always flows from anode to cathode and that, therefore, on account of the rectifying property of the mercury about one-half of the alternating current wave is suppressed. It is further known that the cathode must be at a high temperature or the arc would die out. It is for this reason that a single phase rectifier must have reactance in order to maintain the arc or have a small auxiliary electrode fed from a separate circuit to continually maintain the arc. In a three phase rectifier the three anode currents are 120 degrees apart in phase relation and the arc, therefore, cannot die out even though no reactance or auxiliary electrode is used as the three anode current curves overlap each other. My three-phase rectifier is started by bringing the cathode to the anodes or to an auxiliary electrode, and then drawing the cathode away. Such movements of the cathode may be accomplished by the manually operable mechanism shown in Figure 2, or the electrically operable mechanism shown in Figure 3, or otherwise. The current goes through the three anodes alternately, to the cathode, and the rectified current goes through the circuit E and load F and back to the neutral C. A similar arrangement would be employed in case of other polyphase rectifiers.

Figures 8, 9, 10:
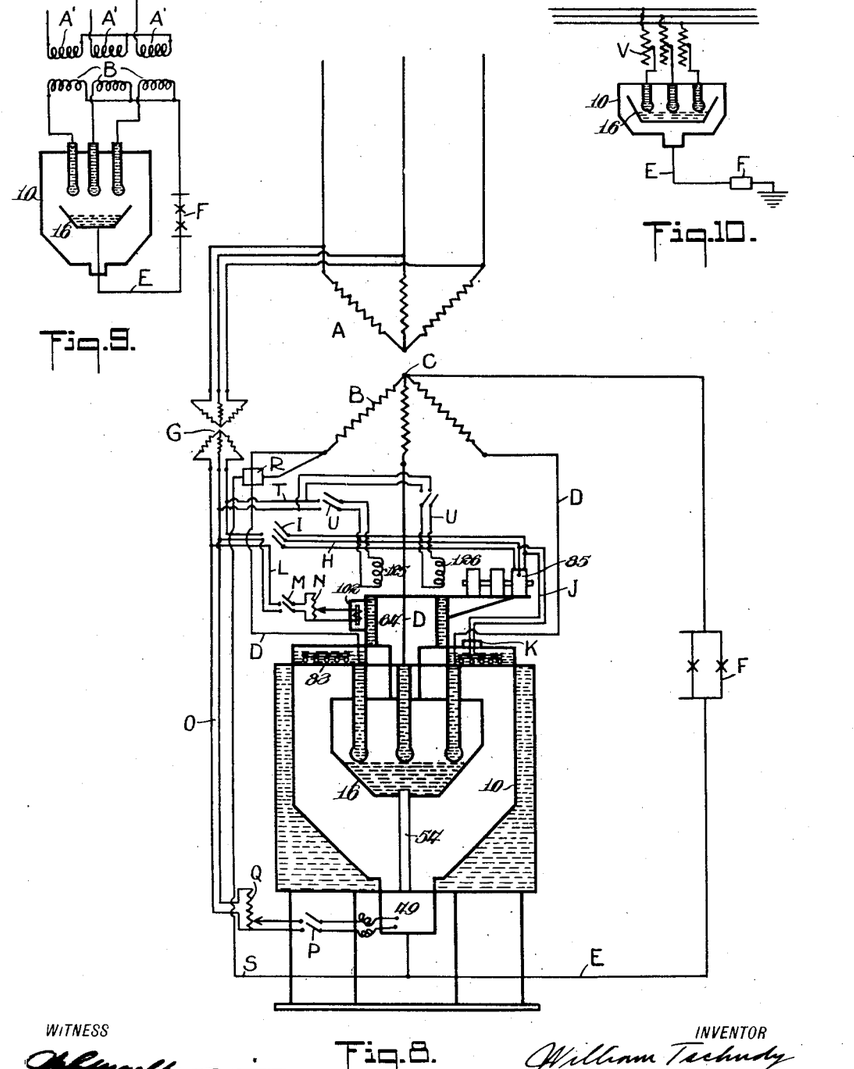
Figures 8 to 13 are wiring diagrams.
Figure 11:
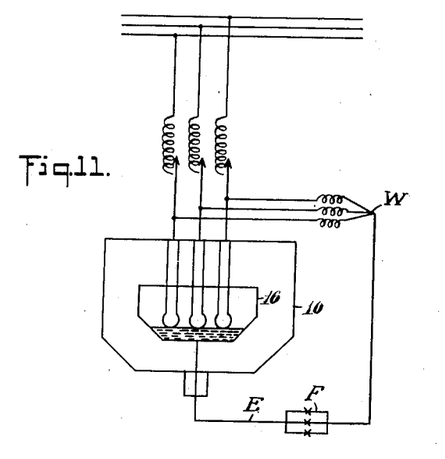
Figure 12:
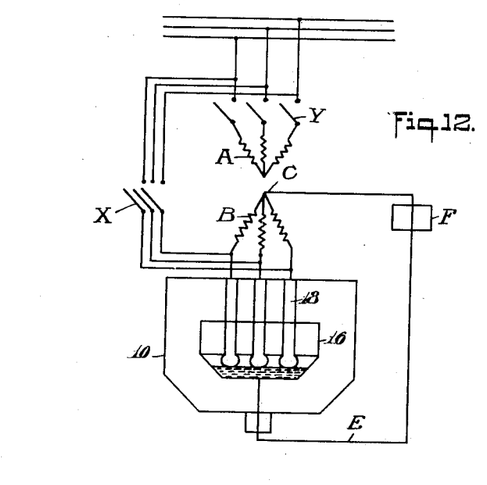
Figure 13:
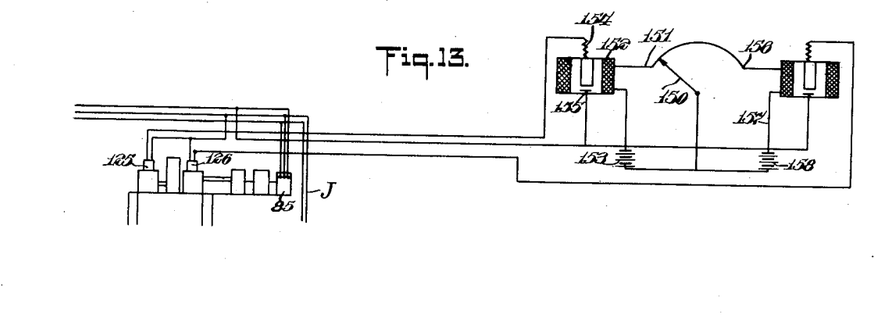

Instead of having a three-phase transformer, three single phase transformers banked together with primaries $A^1$ and secondaries $B^1$ could be employed, as shown in Figure 9. It is thought that this will be sufficiently clear from the illustration so that detailed description is unnecessary. It has previously been mentioned that the high potential necessary for starting a rectifier could be eliminated by the use of a movable cathode and by means of the regulation system as described in my prior patent. The main leads may be connected directly to the anodes without the use of a transformer as indicated diagrammatically in Figure 10. If the potential of the different lead wires varies, the uniform action of the three anodes may be secured by the insertion of adjustable reactance V in the connections to the separate anodes. The connection E from the cathode may lead to ground as in Figure 10 or to an artificial neutral W, as shown in Figure 11, or to the neutral of the alternating current generator. I may have a transformer for starting and then cut out the transformer after the rectifier is in operation. Such an arrangement is shown in Figure 12. With switch X open and switch Y closed the transformer would be in circuit. By reversing the switches the apparatus would operate without the transformer.

Where it is desirable to have an automatic control of the regulating switches as, for instance, an out-door rectifier substation, I may employ such an arrangement as is shown in Figure 13. Here the density regulation is secured by the use of two solenoids operating a controller or separate control valves, as shown in Figure 7. The pointer 150 of a watt loss indicating instrument may move toward the point 151 if the density is too low and thus closes the circuit of a relay 152, the current being furnished from a dry cell 153. The electromagnet mounted on a spring 154 moves toward the plate 155 and by touching it closes the circuit for the solenoid 125 and gas is admitted to the rectifier and the density of the vapor increased. The pointer 150 then moves back from the point 151 and the valve 123 closes. If the density of the vapor is too high the pointer 150 moves toward the point 156 and closes the relay circuit 157 of a battery 158 and this operates in manner similar to that above indicated to energize the solenoid 126. The valve 124 thereupon opens and the suction pump reduces the vapor density. It is obvious that a number of modifications of this scheme are possible for automatically regulating the density of the vapor rectifier. A similar arrangement could be made with the water control apparatus or a combination of the two systems secured.

Having thus described my invention what I claim as new and desire to secure by Letters Patent is:

1. A large-capacity vapor rectifier having a stationary vapor chamber and a pair of main electrodes arranged therein and between which is formed the main rectifying arc, and means independent of the flow of current across the arc for adjusting one of said electrodes to and from the other to completely control the electrical characteristics of said arc.

2. A vapor rectifier of large capacity including a vapor chamber, a pair of main electrodes arranged therein, one of said electrodes presenting a body of material having rectifying properties, and means independent of the flow of current across the arc for adjusting the last mentioned electrode vertically toward and from the other and holding it in any desired adjustment to regulate the arc in accordance with varying working conditions.

3. A vapor rectifier having a stationary vapor chamber, a main stationary anode, a main cathode presenting a body of mercury, and means for moving the cathode vertically toward and from the anode, said means being independent of the current to be rectified.

4. A vapor rectifier including an upper chamber, a plurality of depending main anodes, a main cathode having a member presenting a body of mercury for cooperation with all of said anodes, and manually operable means for adjusting said member vertically.

5. A vapor rectifier including a vapor chamber, a stationary main anode, a mercury cup constituting a main cathode, means independent of the flow of current through said rectifier for adjusting said cathode vertically toward and from said anode and means for effecting an air tight seal at said adjusting means.

6. A vapor rectifier having a vapor chamber, a dependent main anode, a mercury cup constituting a cathode and adjusting means operable outside of said chamber for raising and lowering said cathode at will to thereby regulate the flow of the current to be rectified.

7. A vapor rectifier including a vapor chamber, a depending anode, a cup of mercury constituting a cathode, means for raising and lowering said cathode and a vapor shield rigid with said cup and encircling said anode.

8. A vapor rectifier including an anode, a cathode comprising a cup of mercury and a vapor shield rigid with the cup and encircling the anode, said cathode and anode being relatively adjustable toward and from each other.

9. A vapor rectifier including a vertically adjustable mercury cathode, a vapor condensing chamber and a pair of telescoping tubular members for conducting condensed vapor from said chamber to said cathode.

10. A vapor rectifier including a vertically adjustable cathode and a vapor shield carried thereby.

11. A vapor rectifier having a vertically movable mercury containing cathode cup, a plurality of anodes and separating shields for each anode carried by said cathode cup.

12. A vapor rectifier including a vapor chamber, a tubular anode support integral therewith and an anode secured to the lower end of said support but insulated therefrom.

13. A vapor rectifier including a vapor chamber, an anode support integral therewith and projecting thereinto, an anode secured to the lower end of said support but insulated therefrom and a conductor extending lengthwise through said support.

14. A vapor rectifier including a metallic vapor chamber presenting a depending sleeve integral therewith and an anode secured to the lower end of said sleeve and insulated therefrom.

15. A vapor rectifier having a vapor chamber, a water jacket, an anode support depending from the upper portion of said chamber and having an interior thereof in open communication with said water jacket and an anode secured to the lower end of said support and insulated therefrom.

16. A vapor rectifier having a metallic wall presenting a tubular depending anode support, a water jacket communicating with the interior of said support and an anode secured to the lower end of said anode support and insulated therefrom.

17. A vapor rectifier having a rectifying chamber, the upper portion thereof being of a smaller diameter than the body portion and constituting a condensing portion for density regulation and a plurality of anodes depending within said chamber and around the lower end of said condensing portion, and a tube centrally disposed between said anodes for conducting condensed vapor from said condensing portion to the lower portion of said rectifying chamber and shielding it from the arc.

18. A vapor rectifier including a rectifying chamber having an upper condensing portion terminating in a depending tube, a vertically movable cathode cup and an annular shield carried by said cathode cup and telescoping with said tube.

19. A vapor rectifier having a vertically movable cathode in the form of a cup of mercury and means for returning to said cup mercury condensing on the walls of said chamber and shielding said returning mercury from the action of the arc.

20. A vapor rectifier including a rectifying chamber, a shallow cup of mercury in the lower portion thereof and of the diameter approximating that of said chamber and means for vertically adjusting said cup, the peripheral walls of said cup having apertures therein permitting the return to the cup of mercury condensing and collecting in the lower portion of the chamber outside of the cup.

21. A vapor rectifier having a plurality of depending anodes, a vertically adjustable cathode cup and a plurality of separate shields carried by said cathode cup and encircling said anode.

22. A vapor rectifier including a rectifying chamber, a storage tank for gaseous medium under pressure, a suction or vacuum pump and means for connecting either said tank or said pump to said chamber.

23. A vapor rectifier including a rectifying chamber, a vacuum pump, a tank in which gas is stored under pressure, a three way valve for connecting either said pump or said tank to said chamber.

24. A vapor rectifier including a vapor chamber having mercury resisting non-magnetic metal walls presenting a depending hollow anode support integral therewith, an anode secured to the lower end of said support and insulated therefrom and a vertically movable cathode within said body and below said anode.

25. A vapor rectifier having a cathode including a mercury cup and a vertically adjustable support therefor terminating within the cup and constituting a conductor.

26. A vapor rectifier having a cathode including a mercury cup and a support therefor terminating within the cup and constituting a conductor, said support being vertically adjustable with said cup.

27. A vapor rectifier including a vapor chamber, a water jacket, means for varying the temperature of said water and a thermostat for controlling said last mentioned means.

28. A vapor rectifier having a vapor chamber, a water jacket, means for supplying water thereto and means within said jacket for agitating the water.

29. A vapor rectifier including a vapor chamber, a water jacket, means within said jacket for heating the water, a cooler outside of said jacket and means for circulating the water through said water jacket and cooler.

Signed at New York city, in the county of New York and State of New York, this 14th day of November, A. D. 1919.

WILLIAM TSCHUDY.